Patented Oct. 20, 1936

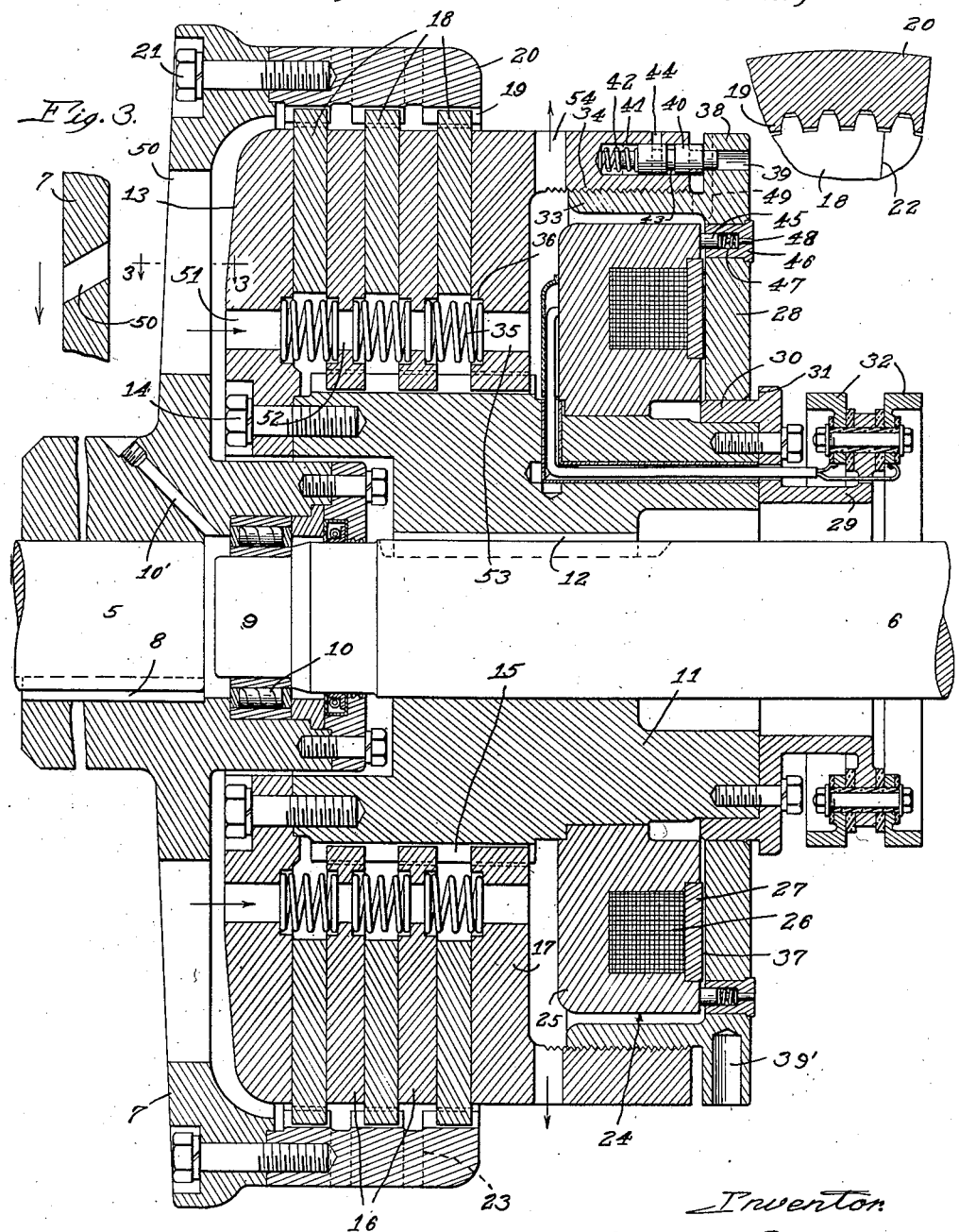

2,057,876

UNITED STATES PATENT OFFICE 2,057,876

MAGNETIC CLUTCH

Earl E. Berry, Beloit, Wis., assignor to Beloit Iron Works, Beloit, Wis., a corporation of Wisconsin Application December 21, 1931, Serial No. 582,219

16 Claims. (Cl. 192—84)

This invention relates to an improved magnetic clutch.

Magnetic clutches as heretofore designed and constructed embodied certain features which had a tendency to produce an undesirable relationship between the magnet and its armature, that is to say, a uniform air gap was not maintained, and adjustment of the clutch to compensate for wear invariably meant uncertainty as to how the adjustment would affect the air gap. Furthermore, most of the magnetic clutches heretofore available were so designed that the force of attraction was not applied properly for uniform and positive engagement of the clutch, with the result that the friction faces would wear unevenly. The present invention, therefore, has for its principal object the provision of a clutch in which special attention has been given both to the electro-magnetic and the friction drive phases to avoid the aforesaid objections.

Magnetic clutches of one type in extensive use have a spring disc carrying the armature and arranged to be deflected upon energization of the magnet to allow engagement of the clutch, and adapted thereafter to serve to disengage the clutch when the magnet would be deenergized. A disc of this kind is an unsatisfactory mounting for the armature because a certain amount of distortion is bound to occur and destroy the uniformity of the air gap and accordingly make uniform and positive engagement of the clutch out of the question. Such a construction is, furthermore, adapted only to the use of a single friction disc. Another very important object of the present invention, therefore, resides in the substitution of compression springs for the spring disc for positively disengaging the clutch by definite separation of the discs upon deenergization of the magnet, and the provision of an armature slidable on a hub toward and away from the magnet and arranged to engage a stop shoulder in its movement away from the magnet so as to insure keeping a definite relationship between the magnet and armature and avoid any question as to the size and uniformity of the air gap.

The clutch of my invention further includes the following features:

(1) The provision of a threaded connection between the armature and the pressure plate. This affords a single adjustment to compensate for wear, while insuring the maintenance of a uniform air gap regardless of the amount of adjustment. Also the provision in connection with this adjustment of a positive lock to keep the parts in adjusted relationship, and improved means for quickly and accurately measuring the air gap.

(2) The provision of fan blades in the back spider or flywheel of the clutch cooperating with registering holes in the driven discs and pressure plate, and exhaust holes behind the pressure plate, for ventilation of the clutch as a whole and the compression springs in particular to prevent overheating.

(3) The provision of openings in the rim of the flywheel adjacent the peripheries of the clutch discs permitting the escape from between the faces of the driving and driven discs of any worn off material so that there may be uniform engagement of the clutch at all times. Also the provision of a rim detachable from the flywheel so that the driving discs, which are split diametrically, for assembly from the side of the clutch, may be removed for inspection or replacement without necessitating disassembling of the clutch as a whole.

(4) The mounting of the driven elements of the clutch, including the hub carrying the magnet, a front plate fixed thereto, and the armature slidable with respect to the hub and operatively connected with the pressure plate, all as a unitary assembly on the driven shaft, the front plate and pressure plate cooperating with one another to cause frictional engagement therebetween of the driving and driven discs. This insures parallelism of the friction faces regardless of any slight disalignment of the driving and driven shafts, so that the parts wear evenly. Furthermore, this insures smoother and more positive engagement of the clutch because with this assembly the force of attraction which becomes the force of engagement for the clutch, is applied in a direct line from the armature to the pressure plate, exactly parallel with the axis of rotation.

The foregoing and other features of the invention will be pointed out in the course of the following detailed description, in which reference is made to the accompanying drawing, wherein—

Figure 1 is a central longitudinal section through my improved magnetic clutch, and Figs. 2 and 3 are sectional details on the correspondingly numbered lines of Figure 1.

The clutch is illustrated in connection with a driving shaft 5 and a driven shaft 6, the former having a back spider or flywheel 7 turning with it and keyed thereto, as shown at 8. The reduced end 9 of the driven shaft is received in a pilot bearing 10 in the flywheel 7 for support of the driving and driven shafts in concentric alignment. This bearing is arranged to be lubricated through a passage 10' provided in the hub of the flywheel. This affords direct communication with the bearing for good lubrication and eliminates the hazard that went with doing the greasing from the front of the clutch where the electrical equipment is located. A well known form of pressure greasing nipple can be fitted directly in the outer end of the pasage 10'. A hub 11 keyed, as at 12, on the driven shaft 6 has a front plate 13 bolted thereto, as appears at 14. The hub 11 is either splined or has gear teeth cut in the periphery thereof, as indicated at 15, and carries thereon one or more driven discs 16 in addition to a pressure plate 17. These cooperate with the front plate 13 to frictionally engage therebetween the driving discs 18, which it will be seen are received in the internal splines or gear teeth 19 formed in the ring 20, arranged to serve as the rim for the flywheel 7, being bolted thereto at 21. The clutch illustrated is known as a triple disc clutch because of its three driving discs 18, but it should be evident that one, two, or any other number of discs could be used, and that where one disc is used the discs 16 would be dispensed with, and the driving disc would be engaged directly between the front plate 13 and pressure plate 17. The driving and driven members are shown as arranged to have direct metal to metal contact, but it will be evident that facings of suitable wear-resisting material could be provided on either the driving or driven members. In the present case, since the driving discs 18 are arranged to be removed for replacement, it would be expedient to provide the facings on opposite sides thereof. Removal and replacement of the driving discs is made possible by having said discs split diametrically as indicated at 22 in Fig. 2 for assembly in the clutch from the side. By unfastening the ring 20 from the flywheel and moving it rearwardly off the splined peripheries of the driving discs, the discs are exposed and may be easily removed for inspection and replaced or others substituted. There is no need for disassembling the clutch or disturbing the connection with the prime mover or the machine driven thereby. In passing, it will be observed that there are slots 23 in the ring 20 between the discs 18. These slots permit the escape of worn off friction material from between the driving and driven discs, the same being thrown out by centrifugal action. This is only one of several factors, as will soon appear, which account for the clutch discs having smooth uniform engagement at all times.

The hub 11 has the magnet 24 mounted thereon, the same consisting of a ring 25 suitably pressed onto the hub and having a magnetizing coil 26 in an annular recess therein and held in place by a non-magnetic ring 27 set into the face of the magnet ring. An armature 28 is slidable relative to the hub 11 toward and away from the magnet 24. A collar 29 of brass or other non-magnetic material is bolted onto the end of the hub 11, as shown, and has an annular flange fitting over the end of the hub 11 to serve as a bearing for the armature 28 to slide upon, and also has an annular shoulder 31 to serve as a limiting stop for the armature when it moves away from the magnet upon disengagement of the clutch, as will soon appear. The collar 29 provides a mounting for the usual slip-rings 32 which, in turn, have the usual brushes cooperating therewith and are connected, as shown, with the magnet winding, whereby to energize and deenergize the magnet accordingly as the circuit is closed or opened. The armature 28 has an externally threaded rim portion 33 threading into the internally threaded rim portion 34 of the pressure plate 17. It is therefore obvious that when the magnet 24 is energized and the armature 28 attracted, the force of attraction is translated into the force with which the pressure plate 17 is moved toward the front plate 13 for engagement therebetween of the driving discs 18. That is to say, the "pull" of the magnet is reflected in the pressure exerted by the pressure plate 17 for engagement of the clutch. A plurality of coiled compression springs 35 are seated in recesses 36 provided in equally circumferentially spaced relation in the opposing faces of the front plate 13, driven discs 18, and pressure plate 17 respectively, and tend normally to urge these driven members apart for disengagement of the clutch. When the magnet 24 is energized, the clutch is engaged against the action of these springs. The fact that the armature 28 is guided for movement on the same hub on which the magnet 23 is mounted insures uniformity of the air gap designated by the reference numeral 37, and also insures uniform distribution of pressure on the driving discs by the pressure plate 17. In other words, the armature is guided in its movement so that the face thereof remains absolutely parallel with the face of the magnet, and being so guided, it transmits a force in a direct line parallel with the axis of the driven shaft to the pressure plate 17, thus equally distributing the pressure for engagement of the clutch. The front plate 13, being also mounted on the hub 11 with its back face in a plane at right angles to the axis of the driven shaft, and the pressure plate 17 being guided for movement as just stated, through its connection with the armature 28, and the pressure of engagement being equally distributed, for the reasons stated, it follows that there will be no tendency for the friction faces to wear unevenly and the same will remain substantially parallel. It should also be evident that the fact that the entire clutch with the exception of the driving discs 18 is mounted as a unitary assembly on the driven shaft, and the driving discs 18 fit loosely in the driving element, makes it possible to have slight disalignment between the driving and driven shafts without disturbing the parallelism of the friction faces. With the present construction utilizing coiled compression springs 35, instead of a spring disc, to take care of disengagement of the clutch, I am enabled to provide an extremely practical clutch construction using more than one driving disc and by doing this obtain many times the driving capacity while utilizing a magnet which, if anything, is weaker than those used with the other constructions, a saving in current consumption being accordingly realized. Furthermore, the utilization of coiled compression springs disposed so as to exert a force parallel with the axis of the driven shaft and hence parallel with the sliding movement of the armature makes for quicker and more positive disengagement and avoids any danger of the moving parts sticking or binding. The springs, are, furthermore, disposed as close to the axis of rotation as possible so as to reduce the inertia factor. By having the discs 18 in front of the magnet instead of surrounding the same I secure a large friction area while keeping the clutch diameter down to a minimum, the diameter being only slightly larger than that of the magnet itself. The advantages of a clutch of small diameter are its greater adaptability and its low inertia factor.

The armature 28 has an annular flange 38 in which a series of circumferentially spaced holes 39 is provided, into any one of which a latch 40 projecting from a hole 41 provided in the rim portion 34 of the pressure plate 17 is arranged to be entered to lock the armature against turning with respect to the pressure plate. A coiled compression spring 42 fitting in the hole 41 in back of the latch 40 normally urges the same outwardly for engagement with the flange 38, and when an adjustment is to be made a drift pin is entered in the hole 39 from the back of the clutch to retire the latch 40 against the action of its spring so as to allow the armature to be turned. An annular groove 43 is provided in the shank of the latch 40 which comes into register with a radial hole 44 provided in the rim 34 when the latch is moved to retracted position, thus permitting the locking of the latch in retracted position by simply entering a pin in the groove 43 through the hole 44. The armature can then be adjusted either by means of the drift pin entered in the hole 39, or another pin set into any one of a plurality of radial holes 39' provided in the rim of the armature. A very fine adjustment can be secured of approximately .004" in advancing the latch 40 one hole. Manifestly, as wear of the friction faces occurs, the air gap 37 upon engagement of the clutch is proportionately diminished, and it is, therefore, necessary to back the armature away from the magnet by threaded adjustment thereof relative to the pressure plate to compensate for the wear. Due to the threaded adjustment there is no danger of disturbing the parallelism between the magnet and armature. In other clutch constructions involving the use of plural point adjustments it was an extremely difficult matter to make an adjustment without throwing the armature and magnet out of parallelism, and, naturally, if these parts are not truly parallel, the air gap therebetween will not be uniform and the clutch engagement will accordingly lose its uniformity, with the result that the clutch will not transmit power properly and will wear unevenly. Naturally, too, a single adjustment can be made in a small fraction of the time required for the other adjustments.

Since the size of the air gap is so important, I have provided two ways of checking same: One is by means of a plunger 45 mounted in a plug 46 in the armature 28 and normally held in engagement with the face of the magnet 24 under the action of a coiled compression spring 37 provided in the plug fitting about the stem 48 of the plunger. The magnet and armature turn together, and the plungers 45, of which one or more will be provided, and equally circumferentially spaced if a plurality are used, serve by engagement with the magnet to indicate at all times the size of the air gap therebetween. The stem 48 is of such length that when the armature is properly adjusted and the clutch is engaged, the outer end thereof is exactly flush with the face of the plug 46. In that way the operator can tell at a glance and without making any measurement whether or not there is the proper air gap. Naturally, if the ends of the stems project slightly, it indicates that the friction faces have worn to that extent and the armature will have to be accordingly adjusted to bring back the flush relationship mentioned. Another way of checking the air gap is by entering a gauging "feeler" directly into said gap through radial slots 49 provided in the rim of the armature 28.

In order to prevent overheating of the clutch as a whole and of the springs 35 in particular inasmuch as overheating of these parts would destroy their tension, I have provided a simple, though effective, ventilating means. Thus, the web of the flywheel 7 has radial slots 50 cored therein, the sides of which are inclined at an acute angle with respect to the plane of rotation of the flywheel to serve as fan blades which, in the turning of the flywheel in the direction indicated by the arrow in Fig. 3, cause air to be taken in as indicated by the small arrow in Figure 1. Holes 51 provided in the front plate 13 register with holes 52 provided in the driven discs 16 and holes 53 in the pressure plate 17, and the air taken in through the slots 50 flows through these registering holes and through radial slots 54 provided in the rim portion 34 of the pressure plate, as indicated by the small arrows. The holes 51—53 are concentric with the recesses 36 in which the spring 35 are seated and hence the air in flowing from the slots 50 through the clutch to the slots 54 serves to keep the springs cool besides ventilating the clutch as a whole. The air taken in through the slots 50 should tend to assist materially in the clearing out of any worn off friction material from between the driving and driven discs when the clutch is disengaged and the discs move apart.

It is believed the foregoing description conveys a good understanding of all of the objects and advantages of my invention. The appended claims have been drawn with a view to covering all legitimate modifications and adaptations.

I claim:

1. In a clutch, the combination of driving and driven shafts, a driving element on the driving shaft, a driven element on the driven shaft, friction drive discs on one of said elements and arranged to frictionally engage friction drive discs on the other element to interconnect said elements, a pressure plate movable on but non-rotatable with respect to one of said elements and arranged to cause engagement of said discs, an annular magnet fixed on and turning with the same element and arranged to be energized, an annular armature rotatable relative to the pressure plate and adjustably threaded on a part projecting from the pressure plate and disposed in close relation to the magnet so as to be attracted thereby, the threaded connection and rotatability of the armature relative to the pressure plate permitting adjustment of the armature relative to the magnet to compensate for wear of the aforesaid discs, and spring means for normally tending to move the pressure plate to retracted position, whereby to move the armature away from the magnet.

2. In a clutch, the combination of driving and driven shafts, a driving element on the driving shaft, a driven element on the driven shaft, friction drive discs carried on one of said elements and arranged to engage friction drive discs on the other element to transmit drive thereto, a pressure plate for causing engagement of said discs, the same being non-rotatably mounted on one of said elements but movable toward and away from the discs, an annular magnet carried on the same element with the pressure plate, an annular armature slidably and rotatably mounted on said element in juxtaposition to the magnet so as to be attracted thereby, said armature being threaded on the pressure plate to permit adjustment relative to the magnet when the armature is turned relative to the pressure plate, whereby to maintain a predetermined air gap between the magnet and armature when the pressure plate is in operative position, spring means tending to move the pressure plate to retracted position, and means cooperating with the armature to limit its retracting movement whereby to keep the same a certain distance from the magnet when the pressure plate is in retracted position.

3. In a magnetic clutch, the combination of a revoluble hub, an annular magnet stationarily mounted on and turning with the hub, a driving and a driven shaft, one of said shafts being fixed to the hub, driving and driven clutch elements for frictionally driving the driven shaft from the driving shaft, a non-magnetic part, an annular armature slidable thereon relative to said hub as a guide toward and away from the magnet, and means operated by the armature in its movement when attracted for frictionally engaging the clutch elements.

4. In a magnetic clutch, the combination of a revoluble hub, an annular magnet stationarily mounted on and turning with the hub, a driving and a driven shaft, one of said shafts being fixed to the hub, driving and driven clutch elements for frictionally driving the driven shaft from the driving shaft, a non-magnetic collar on said hub, an annular armature slidable on said collar as a guide toward and away from the magnet, the collar having a shoulder limiting movement of the armature away from the magnet, whereby to insure a predetermined air gap between the armature and magnet when the magnet is not energized, an annular pressure plate surrounding the hub on the opposite side of the magnet from the armature, the same serving to frictionally engage the clutch elements under pressure, means providing an operating connection between the armature and the pressure plate for transmitting pressure to the clutch elements by the pressure plate upon attraction of the armature, and spring means tending normally to move the pressure plate and armature to retracted position, whereby to cause the armature to engage the aforesaid shoulder.

5. In a magnetic clutch, the combination of a revoluble hub, an annular magnet stationarily mounted on and turning with the hub, a driving and a driven shaft, one of said shafts being fixed to the hub, driving and driven clutch elements for frictionally driving the driven shaft from the driving shaft, a non-magnetic collar on said hub, an annular armature slidable on said collar as a guide toward and away from the magnet, the collar having a shoulder limiting movement of the armature away from the magnet, whereby to insure a predetermined air gap between the armature and magnet when the magnet is not energized, an annular pressure plate surrounding the hub on the opposite side of the magnet from the armature, the same serving to frictionally engage the clutch elements under pressure, spring means tending normally to move the pressure plate and armature to retracted position, whereby to cause engagement of the armature with the aforesaid shoulder, and means providing an adjustable threaded operating connection between the pressure plate and the armature whereby to move the pressure plate toward the front plate upon attraction of the armature and permit adjustment of the pressure plate away from the aforesaid shoulder to compensate for wear of the clutch elements.

6. In a magnetic clutch, the combination of a revoluble hub, an annular magnet stationarily mounted on and turning with the hub, a driving and a driven shaft, one of said shafts being fixed to the hub, driving and driven clutch elements for frictionally driving the driven shaft from the driving shaft, an annular armature slidable relative to said hub as a guide toward and away from the magnet, an annular pressure plate surrounding the hub on the opposite side of the magnet from the armature, the same serving to frictionally engage the clutch elements under pressure, and means providing a threaded connection between the armature and the pressure plate annularly with respect to the magnet, whereby to transmit pressure to the clutch elements by the pressure plate upon attraction of the armature, and whereby the armature is adjustable relative to the pressure plate to secure a predetermined spaced relation between the armature and the magnet, said last mentioned means being constructed so that at least one opening is provided affording access to the air gap between the face of the magnet and the inside face of the armature, whereby to permit direct measurement of said gap.

7. A clutch of the class described comprising in combination with an annular magnet, an annular armature turning therewith and arranged to be attracted thereby, and friction clutch means engaged by movement of the armature toward the magnet upon attraction, of an air gap indicating plunger mounted on the armature for unlimited movement in the direction of the magnet, whereby to indicate by constant engagement with the magnet and the position of the plunger relative to the armature, the size of the air gap between the armature and magnet, said plunger having an outer end arranged to lie flush with a surface on the back of the armature when the armature is spaced a predetermined distance from the magnet, and spring means normally holding the plunger extended from the armature for constant engagement with the magnet.

8. A clutch of the class described comprising in combination with an annular magnet, an annular armature turning therewith and arranged to be attracted thereby, and friction clutch means engaged by movement of the armature toward the magnet upon attraction of an air gap indicating plunger mounted on the armature and having spring means normally holding the same extended from the armature for constant engagement with the magnet, said plunger being of a predetermined length so as to have the outer end thereof lie flush with a surface on the back of the armature when the armature is spaced a predetermined distance from the magnet, the end of said plunger being thereby arranged to project from said surface in the event of wear of the clutch, and means providing an adjustable threaded connection between the armature and the clutch, whereby to maintain a predetermined air gap between the armature and magnet.

9. In a magnetic clutch, the combination of a revoluble hub, an annular magnet stationarily mounted on and turning with the hub, a driving and a driven shaft, one of said shafts being fixed to the hub, driving and driven clutch elements for frictionally driving the driven shaft from the driving shaft, an annular armature slidable relative to said hub as a guide toward and away from the magnet, an annular pressure plate surrounding the hub on the opposite side of the magnet from the armature, the same serving to frictionally engage the clutch elements under pressure, and annular flanges on the pressure plate and armature threadedly engaged to afford an adjustable connection between the armature and pressure plate for transmitting pressure to the clutch elements upon attraction of the armature by the magnet, the threaded engagement of said flanges permitting adjustment of the armature relative to the pressure plate to secure a predetermined air gap between the armature and the magnet, the flange on the armature having at least one opening provided therein through which the inside face of the armature is visible from the outside of the clutch so as to permit direct measurement of the air gap.

10. A magnetic clutch comprising a driving and a driven member, a plurality of cooperating friction rings carried by each of said members and adapted to be forced laterally into engagement with each other to transmit driving torque from said driving to said driven member, one of said members having an annular channel formed therein, an annular energizing winding positioned within said annular channel, an armature adjustably supported by said last mentioned member for varying the torque transmitted by said magnetic clutch and adapted to be moved towards said last mentioned member when said winding is energized, said armature being spaced from said friction rings, and means for transmitting the force of said armature to said friction rings, said armature and said means being slidably actuated.

11. In a magnetic clutch, the combination of a revoluble hub, an annular magnet stationarily mounted on and turning with the hub, a driving and a driven shaft, one of said shafts being fixed to the hub, driving and driven clutch elements for frictionally driving the driven shaft from the driving shaft, a guide on said hub, an annular armature slidable on said guide toward and away from the magnet, the guide having an annular shoulder at one end thereof limiting movement of the armature away from the magnet whereby to insure a predetermined air gap between the armature and magnet when the magnet is not energized, spring means tending normally to move the armature to retracted position in engagement with the shoulder, an annular pressure plate surrounding the hub on the opposite side of the magnet from the armature and arranged to move the clutch elements into engagement, and means surrounding the armature providing an adjustable threaded connection between the pressure plate and armature whereby the pressure plate moves with the armature.

12. A clutch of the class described comprising in combination with an annular magnet, an annular armature turning therewith and arranged to be attracted thereby, and friction clutch means engaged by movement of the armature toward the magnet upon attraction, of an air gap indicating plunger mounted on the armature for unlimited movement in the direction of the magnet, whereby to indicate by constant engagement with the magnet and the position of the plunger relative to the armature, the size of the air gap between the armature and magnet, and spring means normally holding the plunger extended from the armature for constant engagement with the magnet.

13. A magnetic clutch comprising a driving and a driven member, one of said members having an outer shell like portion and the other of said members having a hub like portion located within said shell like portion, friction means alternately slidably secured to said shell like portion and said hub like portion, an electromagnet spaced axially from said friction means and having an annular pole directed outwardly away from said friction means, an armature for said magnet located in front of said annular pole, a pressure applying element located between said magnet and said friction means and operated by said armature, a pressure resisting element located on the other side of said friction means, said electro-magnet and said armature and said pressure applying and pressure resisting elements being carried by one of said members, and screw threaded adjusting means for varying the spacing between the pressure applying element and the pressure resisting element to compensate for wear of said friction means.

14. In a magnetic clutch, the combination of driving and driven shafts, a driving element on the driving shaft, a driven element on the driven shaft, friction drive disks mounted on the driving and driven elements and adapted to be frictionally engaged to transmit drive from the driving to the driven element, a pressure plate slidably and nonrotatably mounted on one of said driving and driven elements for movement toward and away from said disks to cause engagement thereof, an annular magnet fixed on the element on which the pressure plate is mounted so as to turn therewith, collector rings electrically connected with the magnet for energizing the same by passage of current therethrough, a collar for supporting said rings having an annular flange of non-magnetic material fitting over the end of the element on which the magnet is mounted and serving to support said rings in true concentric relation to said member, an annular armature of magnetic material movable with said pressure plate and slidably mounted on said flange for movement toward and away from the magnet, spring means tending normally to move the pressure plate to retracted position, and an annular shoulder provided on said collar for abutment by the armature to limit the retracting movement thereof, whereby to hold said armature in a predetermined spaced relation to the magnet when the pressure plate is in retracted position.

15. In a magnetic clutch, in combination, a driving and a driven member, a plurality of cooperating friction rings carried by each of said members and adapted to be forced laterally into engagement with each other to transmit driving torque from said driving to said driven member, an electromagnet spaced axially from said friction rings, an armature for said electromagnet located axially in front thereof, a pressure applying element located at one end of said friction rings and a pressure resisting element located at the other end thereof, said pressure applying element being operated by said armature, said electromagnet and said armature and said pressure applying and pressure resisting elements being carried by one of said members, and means for adjusting the spacing between the pressure applying element and the pressure resisting element to vary the torque of the clutch.

16. A magnetic clutch comprising, in combination, a driving and a driven member, one of said members having an outer shell like portion and the other of said members having a hub like portion located within said shell like portion, cooperating friction rings operating between said shell and hub like portions adapted to be forced into engagement with each other to transmit driving torque from said driving to said driven member, an electromagnet spaced axially from said friction rings and carried by one of said members, an armature for said electromagnet spaced axially therefrom, a pressure applying element located at one end of said friction rings, and a pressure resisting element located at the other end thereof, said pressure applying element being operated by said armature, said electromagnet and said armature and said pressure applying and pressure resisting elements being carried by one of said members, and means for adjusting the spacing between the pressure applying element and the pressure resisting element to vary the torque of the clutch.

EARL E. BERRY.